US010094713B2

(12) United States Patent
Owechko

(10) Patent No.: US 10,094,713 B2
(45) Date of Patent: Oct. 9, 2018

(54) HYPERSPECTRAL DEMIXING USING FOVEATED COMPRESSIVE PROJECTIONS

(71) Applicant: The Boeing Company, Chicago, IL (US)

(72) Inventor: Yuri Owechko, Newbury Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 543 days.

(21) Appl. No.: 14/693,401

(22) Filed: Apr. 22, 2015

(65) Prior Publication Data
US 2016/0313184 A1    Oct. 27, 2016

(51) Int. Cl.
*G01J 3/28* (2006.01)
*G06K 9/00* (2006.01)
*G06K 9/62* (2006.01)
*G06K 9/46* (2006.01)

(52) U.S. Cl.
CPC ........ *G01J 3/2823* (2013.01); *G06K 9/00127* (2013.01); *G06K 9/6219* (2013.01); *G01J 2003/283* (2013.01); *G06K 2009/4657* (2013.01)

(58) Field of Classification Search
CPC .............. G01J 3/2823; G01J 2003/283; G06K 9/00127; G06K 9/6219; G06K 2009/4657
See application file for complete search history.

(56) References Cited

U.S. PATENT DOCUMENTS

| 6,675,104 B2 * | 1/2004 | Paulse ............... G06F 19/24 702/22 |
| 2011/0052019 A1 * | 3/2011 | Moshe ................. G06K 9/46 382/128 |
| 2013/0054603 A1 * | 2/2013 | Birdwell ............. G06K 9/6224 707/738 |
| 2016/0313181 A1 * | 10/2016 | Golub .................. G01J 3/0205 |

OTHER PUBLICATIONS

Extended European Search Report for Application No. 16162300.4 dated Oct. 5, 2016.
Tits, et al. "The Potential and Limitations of a Clustering Approach for the Improved Efficiency of Multiple Endmember Spectral Mixture Analysis in Plant Production System Monitoring", IEEE Transactions on Geoscience and Remote Sensing, vol. 50, No. 6, Jun. 1, 2012, pp. 2273-2286.

* cited by examiner

*Primary Examiner* — Manuel L Barbee
(74) *Attorney, Agent, or Firm* — MH2 Technology Law Group LLP

(57) ABSTRACT

The present disclosure generally relates to systems and methods for spectral demixing. An example technique includes obtaining empirical spectroscopic data representing a plurality of frequencies of electromagnetic energy that has interacted with a specimen, accessing a computer readable representation of a hierarchal spectral cluster tree representing a spectral library, demixing, with data on each of a plurality of levels of the hierarchal spectral cluster tree, foveated spectroscopic data derived from the empirical spectroscopic data, identifying at least one node in the hierarchal spectral cluster tree as corresponding to the empirical spectroscopic data, and outputting an endmember abundance assessment of the specimen corresponding to at least the at least one node.

20 Claims, 11 Drawing Sheets

HYPERSPECTRAL DEMIXING USING FOVEATED COMPRESSIVE PROJECTIONS

FIELD

The present disclosure relates generally to hyperspectral imaging and spectroscopy.

BACKGROUND

Hyperspectral cameras image a scene in both spatial and spectral dimensions. Unlike conventional color cameras, which have three broad overlapping color channels over the visible band, hyperspectral cameras have hundreds or thousands of narrow contiguous wavelength channels over the range from visible to long-wave infrared. Hyperspectral cameras may capture images that include millions of pixels, each pixel representing a reflected spectrum.

Hyperspectral imaging has become a core area in the geoscience and remote sensing community. In addition, new applications in object detection, road surface analysis, autonomous navigation, and automatic target recognition are being explored as the size, weight, power requirements, and cost of hyperspectral imaging cameras are reduced.

The spectral demixing problem in hyperspectral data analysis is central to determining the composition of material mixtures based on a reflectivity spectrum. A measured reflectivity spectrum is normally composed of a mixture of spectra arising from different pure materials, or "endmembers", in the material mixture. Spectral demixing is the process of identifying the endmembers in the material mixture and estimating their abundances.

SUMMARY

According to various examples, a method of spectral demixing is disclosed. The method includes obtaining empirical spectroscopic data representing a plurality of frequencies of electromagnetic energy that has interacted with a specimen, accessing a computer readable representation of a hierarchal spectral cluster tree representing a spectral library, demixing, with data on each of a plurality of levels of the hierarchal spectral cluster tree, foveated spectroscopic data derived from the empirical spectroscopic data, identifying at least one node in the hierarchal spectral cluster tree as corresponding to the empirical spectroscopic data, and outputting an endmember abundance assessment of the specimen corresponding to at least the at least one node.

Various optional features of the above method examples include the following. The empirical spectroscopic data may represent a plurality of frequencies of electromagnetic energy reflected off of the specimen. The empirical spectroscopic data may represent a pixel. The hierarchal spectral cluster tree may include a plurality of levels includes at least one terminal level including nodes representing individual endmembers. The hierarchal spectral cluster tree may include a plurality of prototype nodes, where a respective prototype node may represent a plurality of endmembers. The method may include hierarchical clustering the spectral library. The demixing foveated spectroscopic data may include performing foveated compressive projection. The demixing foveated spectroscopic data may include sparse reconstruction. The method may include using the endmember abundance assessment for at least one of geospatial analysis, target recognition, surveillance, chemical identification, remote sensing, and combinations thereof. The outputting may include causing a display in a human readable format.

According to various examples, a system for spectral demixing is disclosed. The system includes an interface configured to obtain empirical spectroscopic data representing a plurality of frequencies of electromagnetic energy that has interacted with a specimen, at least one electronic processor communicatively coupled to a computer readable representation of a hierarchal spectral cluster tree representing a spectral library, at least one electronic processor configured to demix, with data on each of a plurality of levels of the hierarchal spectral cluster tree, foveated spectroscopic data derived from the empirical spectroscopic data, at least one electronic processor configured to identify at least one node in the hierarchal spectral cluster tree as corresponding to the empirical spectroscopic data, and at least one electronic processor configured to output an endmember abundance assessment of the specimen corresponding to at least the at least one node.

Various optional features of the above system examples include the following. The empirical spectroscopic data may represent a plurality of frequencies of electromagnetic energy reflected off of the specimen. The empirical spectroscopic data may represent a pixel. The hierarchal spectral cluster tree may include a plurality of levels including at least one terminal level including nodes representing individual endmembers. The hierarchal spectral cluster tree may include a plurality of prototype nodes, where a respective prototype node represents a plurality of endmembers. The system may include at least one electronic processor configured to hierarchically cluster the spectral library. The at least one electronic processor configured to demix foveated spectroscopic data may be further configured to perform foveated compressive projection. The at least one electronic processor configured to demix foveated spectroscopic data may be further configured to perform sparse reconstruction. The system may include at least one electronic processor configured to provide the endmember abundance assessment for at least one of geospatial analysis, target recognition, surveillance, chemical identification, remote sensing, and combinations thereof. The at least one electronic processor configured to output may be further configured to cause a display in a human readable format.

BRIEF DESCRIPTION OF THE DRAWINGS

Various features of the present disclosure can be more fully appreciated, as the examples become better understood with reference to the following detailed description, when considered in connection with the accompanying figures, in which.

DESCRIPTION

Figure 1:
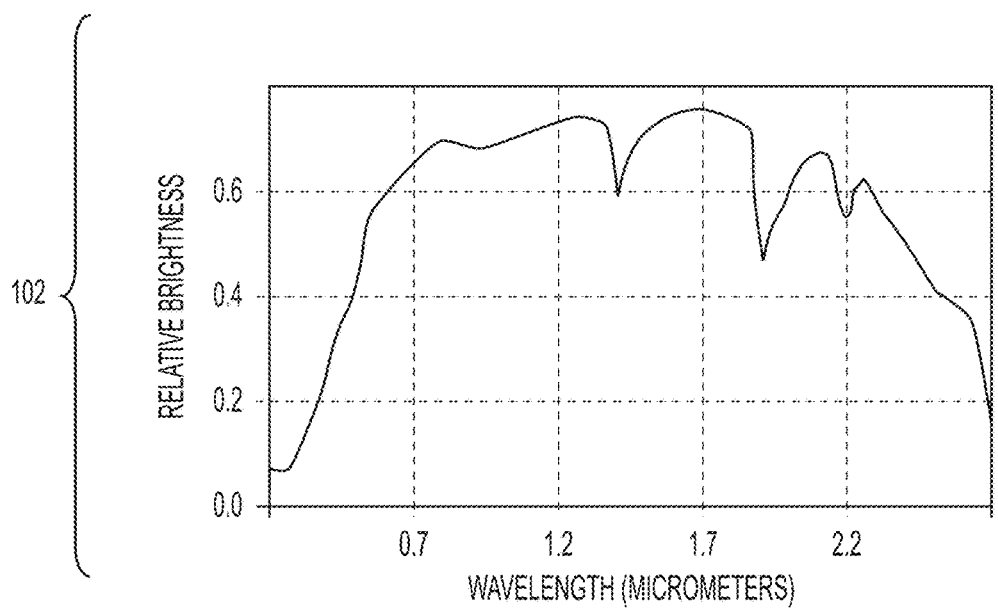
FIG. 1 schematically depicts example spectra for pure materials and a mixture.
Figure 1:
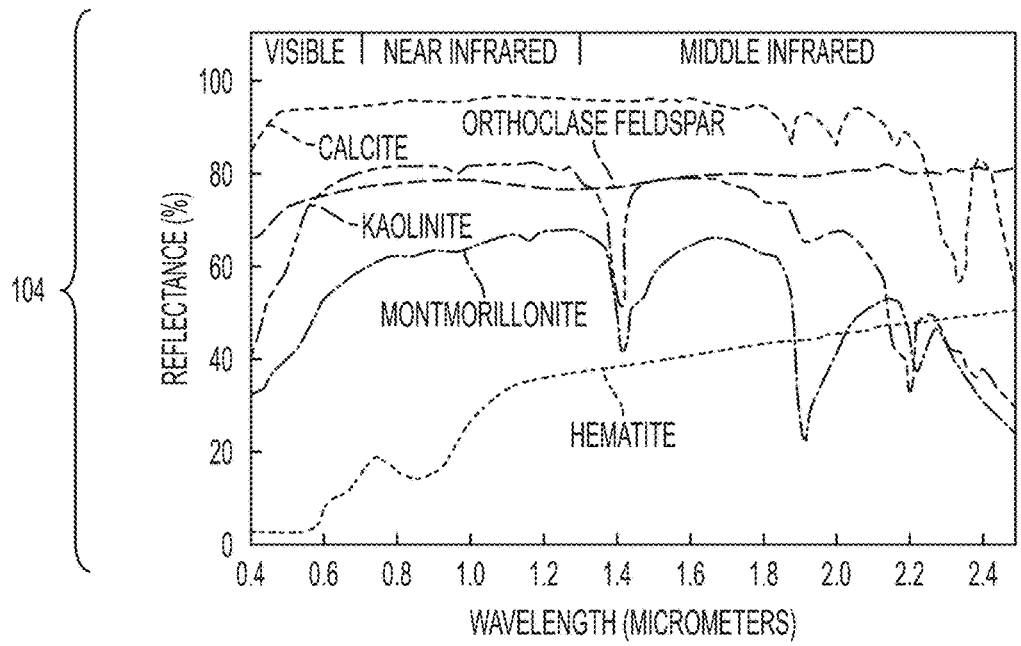

Reference will now be made in detail to the present examples of the present disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations. These examples are described in sufficient detail to enable those skilled in the art to practice the disclosed subject matter and it is to be understood that other examples may be utilized and that changes may be made without departing from the scope of the present disclosure. The following description is, therefore, merely exemplary.

Some examples utilize foveated compressive projection for performing hyperspectral demixing based on a variable resolution, or "foveated", representation of a spectral library of representations of spectra of many different materials organized as a hierarchical tree, combined with nonlinear-compressive-sensing-based sparsity maximization and over-sampling. Foveated compressive projection allows endmembers to be determined with high accuracy, robustness against noise, and computational efficiency.

Unlike certain prior art linear and heuristic demixing methods, some examples described herein can measure the abundances of endmembers in a hyperspectral mixture without assuming a pure material pixel exists in the data for each endmember and without human guidance, which makes it suitable for automated hyperspectral analysis applications. Some examples enable the use of very large spectral libraries and do not require estimation (e.g., by a human) of endmembers from the input data. Unlike prior art sparsity-based methods, some examples described herein use foveated projections, over-sampling, and a tree-organized multi-resolution spectral library to improve the accuracy and noise robustness of the demixing. In addition, the combination of tree-based clustering of the spectral library with foveation enables endmembers to be identified very quickly by moving down the best matching branch at each level. This greatly reduces the number of spectral prototypes that have to be examined to make a match, which reduces computational complexity. Reduced computational complexity, in turn, provides for faster processing time for the demixing operation, reduced computer hardware requirements, and reduced power consumption. Further, unlike some prior art demixing approaches, the computational complexity of foveated compressive projection is logarithmic in the size of the spectral library. In addition, in some examples the resolution of the demixing process in abundance space increases as the processing continues. Therefore, if a coarse classification of the mixture components is sufficient, then the processing can be halted before reaching the bottom of the tree (i.e., the terminal tree level), thereby further reducing processing time.

FIG. 1 schematically depicts example spectra for pure materials and a mixture. In particular, spectrum graph 102 depicts measured relative intensities of a number of wavelengths of electromagnetic energy. The measurements may represent a single pixel from an image taken by a hyperspectral camera consisting of thousands or millions (or more) of pixels. In general, materials have characteristic reflectivity variations across wavelengths, which can be used for remote measurement of a scene's composition.

In many cases, a pixel will cover an area with multiple materials or endmembers, which results in an additive mixture of spectra. The objective of the hyperspectral demixing problem is to estimate the endmember abundances from a single measured mixture of spectra. Graph 104 graphically depicts a number of spectra that, when additively combined, form the spectrum of a material sample as depicted in graph 102. Thus, graph 104 depicts hyperspectral demixing applied to the sample's spectrum depicted in graph 102.

Figure 2:
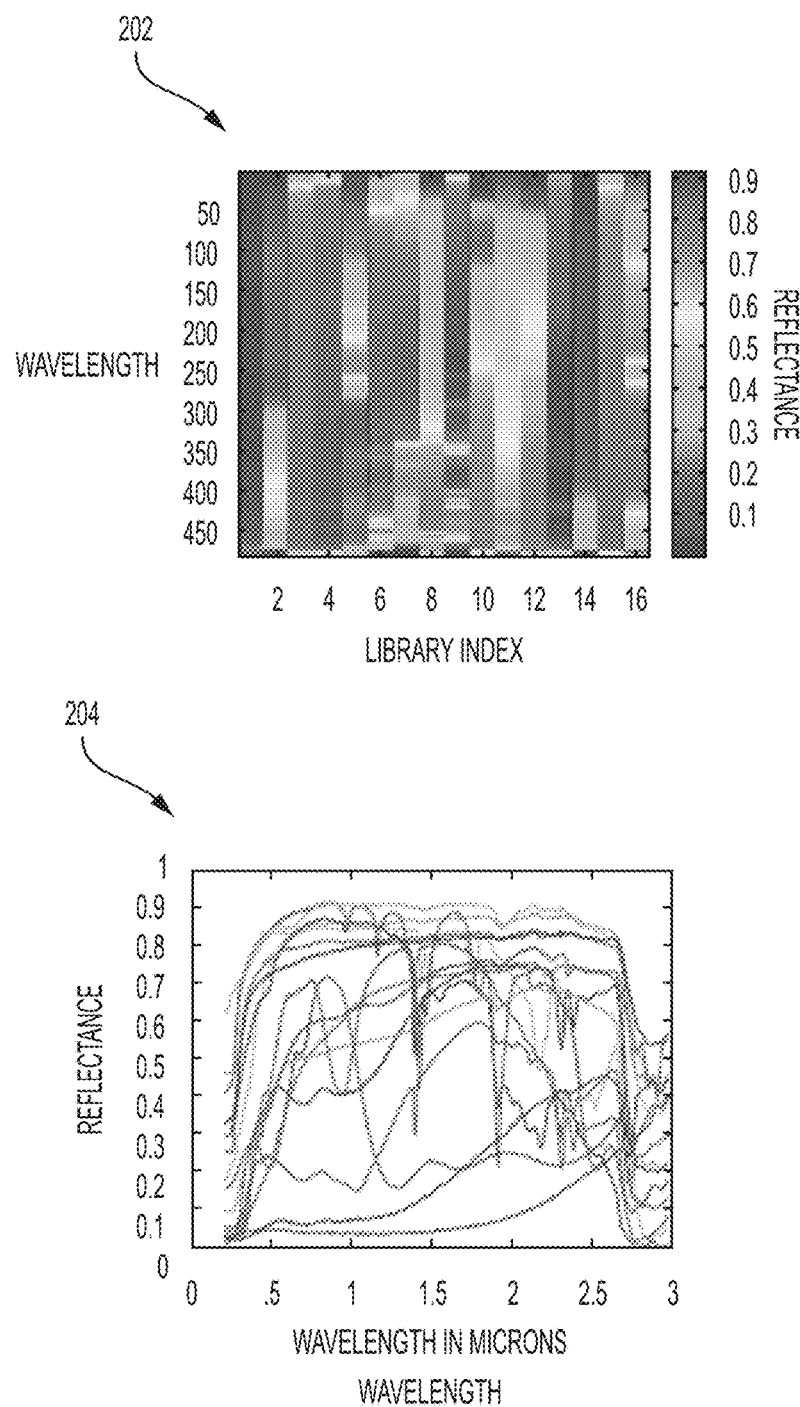
FIG. 2 schematically depicts a spectral library in two ways.

FIG. 2 schematically depicts a spectral library in two ways. In particular, FIG. 2 depicts an example spectral library in terms of shading as an indication of amplitude in matrix 202 and in terms of component spectra 204. As shown in FIG. 2, the measured spectrum vector x for a pixel can be modeled as a linear mixture of N endmember (pure material) spectra contained in a spectral library represented by matrix $\phi$. The example spectral library $\phi$ is formed using N=16 mineral spectra endmembers. The N columns of $\phi$ consist of the endmember spectra and the Q rows represent the wavelength channels, where Q=480 in this example. A discussion of the hyperspectral mixing problem in terms of such a spectral library follows.

The hyperspectral demixing problem can be formalized in part using Equation 1, by way of non-limiting example, below.

$$x = \phi \alpha \quad (1)$$

In Equation 1, the symbol x represents a measured Q×1 spectrum vector, the symbol $\alpha$ represents the N×1 endmember abundance vector to be solved for, and the symbol $\phi$ represents a spectral library formalized in matrix form. In terms of Equation 1, x is modeled as a mixture of endmembers with mixing coefficients from a. In terms of these conventions, a goal of hyperspectral demixing is to estimate $\alpha$, given x and $\phi$.

The hyperspectral demixing problem is made difficult by the need to have a large spectral library, the similarity of many spectra, and noise in the measured spectrum. In addition, the number of different materials covered by a pixel is usually small, so $\alpha$ may be sparse and the number K of nonzero a elements may be small relative to N. This means a least squares solution using a pseudo-inverse of $\phi$ will have many false detections and low accuracy.

Compressive sensing has been developed as a method for reducing the number of physical sensors or pixels needed in a camera or other sensing hardware without reducing the output data resolution by taking advantage of sparsity in the physical signal being sensed in some representation domain. In other words, it utilizes the sparse structure of the signal. To date, its usage in hyperspectral imaging has been limited to the design and construction of new optical hardware with reduced sensor counts.

According to some examples, technology from the field of compressive sensing is used to improve sparsity-based demixing by reducing the mutual coherence of $\phi$ using a known M×Q random measurement matrix A that multiplies x to form an M×1 measurement vector y. Compressive sensing techniques can then be used to estimate $\alpha$ using the L1 norm and least squares error minimization according to, by way of non-limiting example, Equations 2 and 3 below.

$$y = A\phi\alpha + \xi \quad (2)$$

$$\hat{\alpha} = \arg\min \|\alpha\|_1 \text{ subject to } \|y - A\phi\alpha\| < \varepsilon \quad (3)$$

In Equations (2) and (3) above, the noise term $\xi = A\zeta$ takes into account the measurement noise $\zeta$ in the original sensor data. Compressive sensing techniques have shown that a lower bound for the number of measurements M needed to estimate $\alpha$ is given by Equation (4), for example, below.

$$M \gtrsim \gamma \mu(A,\phi) K \log(N) \tag{4}$$

In Equation 4 above, the term K represents the number of nonzero elements in the N×1 vector $\alpha$ (a measure of sparsity), $\gamma$ is a small constant, and the mutual coherence function $\mu$ is specified by Equation 5, by way of non-limiting example, below.

$$\mu(A,\phi) = \sqrt{N} \max_{i,j} |\langle A^i, \phi^j \rangle| \tag{5}$$

In Equation 5 above, the term $|\langle A^i, \phi_j \rangle|$ is the inner product between row i of A and column j of $\phi$. According to some examples, the number of measurements required for successful convergence and estimation of $\alpha$ can therefore be reduced by reducing the coherence $\mu$ between A and $\phi$. Random A matrices have been found to be a general purpose solution for reducing $\mu$. Further, known methods exist for adapting A to the library $\phi$ to further reduce M for specialized applications.

Figure 3:
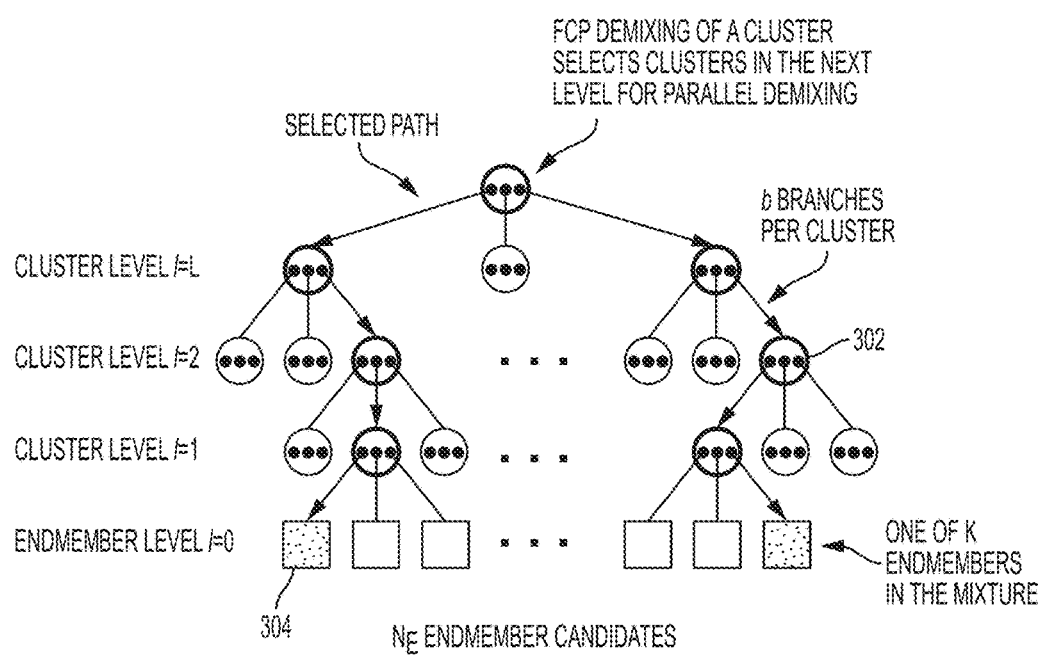
FIG. 3 schematically depicts a spectral library arranged as a spectral cluster tree according to some examples.

FIG. 3 schematically depicts a spectral library arranged as a hierarchal spectral cluster tree according to some examples. For simplicity, each cluster (e.g., 302) is depicted with b=3 branches. However, in general, the branching may be different for each cluster and will depend on the library structure. The more independent or less overlapping the paths, the more parallelization is possible for implementations.

Each cluster above the final level represents a spectral prototype. In general, a cluster at Level L is composed of subclusters from Level L-1. Each prototype cluster can be an average (e.g., mean or median) of its constituent subclusters. Alternately, according to some examples, clusters are formed as convex hulls enclosing their constituent subclusters. Other clustering algorithms may be employed in the alternative. Thus, the mixture spectrum is modeled with increasing accuracy along each tree branch.

In general, reducing the mutual coherence p in order to reduce the bound on M (and therefore improve reconstruction stability, noise robustness, and accuracy) can be achieved not only by reducing $\langle A_i, \phi_j \rangle$ through proper choice of A for a given $\phi$, but also by reducing N, the size of the abundance vector $\alpha$. Pursuing this approach naïvely would reduce the number of endmembers in the spectral library. However, by using foveation or multi-level resolution in both $\alpha$ and $\phi$, and by clustering the library endmembers in a hierarchical tree structure based on their similarity as shown in FIG. 3 and as is done in some examples, N can be reduced without reducing the number of endmembers that can be detected.

In general, some examples proceed down the levels of a hierarchal spectral cluster tree and perform demixing and identification of cluster prototypes at each level using foveated compressive projections and sparse reconstruction methods, e.g., according to Equations 2-5. The identification of subcluster prototypes in a cluster at one level as corresponding to a measured spectrum determines which branches of the tree to proceed down to perform the next level of demixing. This process may continue until the bottom endmember level of the tree (e.g., the level of the "leaves") is reached, or until sufficient accuracy is obtained. In general, proceeding to terminal nodes will result in following K tree branches, where K is the number of endmembers in the mixture.

Using a hierarchal spectral cluster tree as depicted in FIG. 3 has many advantages. The computational complexity for solving the hyperspectral demixing problem using such a tree is logarithmic in the spectral library size N, due to the tree search structure. Proceeding down the tree and solving smaller demixing problems at each level is orders of magnitude less complex than solving a single large demixing problem without foveation.

Figure 4:
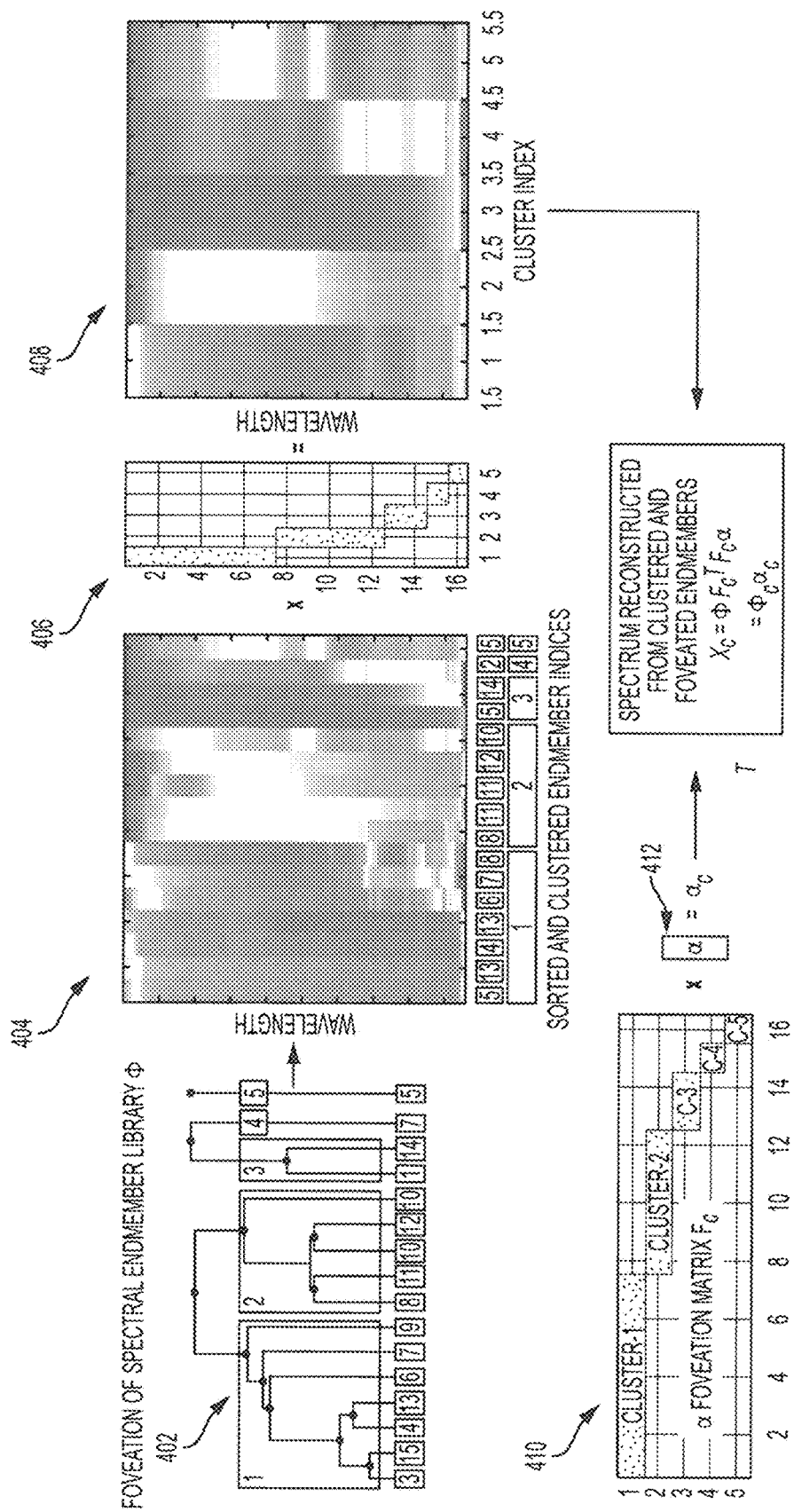
FIG. 4 depicts a usage of a foveation matrix according to some examples.

FIG. 4 depicts an example usage of a foveation matrix according to some examples. Foveation, e.g. reduction of N to a smaller number $N_C$ by organizing both the spectral library and the corresponding coefficients in the abundance vector into multiple hierarchical clusters, can be implemented adaptively by modifying $\alpha$ (412) and $\phi$ (402) using the separable foveation matrix operator $F = F_C^T F_C$ (406, 410) as shown in FIG. 4. In particular, FIG. 4 schematically illustrates how the N×N foveation operator $F = F_C^T F_C$ (406, 410) implements hierarchical clustering and foveation in both the spectral library and the endmember abundances. $F_C$ (410) operates on the abundance vector $\alpha$ (412) to form $\alpha_c$ and reduce its size from N×1 to $N_C \times 1$ by grouping and adding rows. Likewise, $F_C^T$ (406) performs a similar operation on the columns of the endmember library $\phi$ (404), forming $\phi_C$ (408) and reducing its size from Q×N to Q×$N_C$.

The form of F (406, 410) and value of $N_C$ is determined using hierarchical tree clustering of $\phi$, as illustrated by the dendrogram 402, which groups endmembers into clusters and clusters into bigger clusters on higher levels of the tree. Each cluster in a level is represented by a prototype spectrum, which may be an average or other function of the spectra in the cluster. The prototypes form the clustered library $\phi_C = \phi F_C^T$. In this example for one level of the tree, F implements a clustering of $\alpha$ and $\phi$ with N=16 into $N_C$=5 clusters. The prototypes form the columns of $\phi_C$. Each level of clustering is represented by its own $\phi_C$ and $\alpha_c$. In general, any known clustering technique may be used.

A hyperspectral demixing process according to some examples includes proceeding down the levels of the tree and performing demixing and identification of cluster prototypes at each level using compressive projections and sparse reconstruction methods. The identification of prototypes in the mixture at one level determines which branches of the tree to proceed down to perform the next level of demixing. The resolution of the spectral mixture model in endmember space increases at each lower level, but the resolution in wavelength stays constant. It is possible that more than one cluster will be selected in a level, depending on the similarity of the endmember spectra in the mixture. This will lead to more than one demixing process in each of the subsequent levels. The process may proceed with increasing mixture modeling accuracy until the bottom endmember level of the tree is reached. This multiresolution process can be stopped before the bottom is reached if high discrimination between endmembers is not required and identification of endmember classes or categories is sufficient, which will further reduce the computational complexity. The computational complexity of proceeding down the tree and solving small demixing problems at each level is logarithmic in the spectral library size and orders of magnitude less than solving a single large demixing problem without foveation.

An example algorithm for reconstructing the foveated abundance vector $\alpha_c$ is given by the following equations, by way of non-limiting example.

$$y_c = A\phi_C F_C^T \alpha + \xi = A\phi_C \alpha_c + \xi \tag{6}$$

$$\hat{\alpha}_c = \arg\min_{\alpha_c} \|\alpha\|_1 \text{ subject to } \|y_c - A\phi_C \alpha_c\| \le \varepsilon \tag{7}$$

In the above equations, $y_c$ is the measured projection vector and represents sensor noise. The reduced lower bound on the number of measurements $M_C$ required for reconstructing $\alpha_c$ is given by the following equations, by way of non-limiting example.

$$M_C \geq \gamma \mu C^2(A, \phi_C) K \log(N_C) \quad (8)$$

$$\mu_C(A, \phi_C) = \sqrt{N_C} \max_{i,j} |\langle A^i, \phi F_C^j \rangle| \quad (9)$$

The reduction factor of $M_C$ compared with M is given, by way of non-limiting example, as follows.

$$\frac{M_C}{M} \approx \frac{N_C}{N} \quad (10)$$

Note that Equation 10 makes use of the observation depicted by Equation 11, below.

$$\max_{i,j} |\langle A^i, \phi F_C^j \rangle| \approx \max_{i,j} |\langle A_i, \phi^j \rangle| \quad (11)$$

Thus, foveation can be used not only to reduce N, but also to increase the range of M over which the foveated compressive projection reconstruction is stable.

Figure 5:
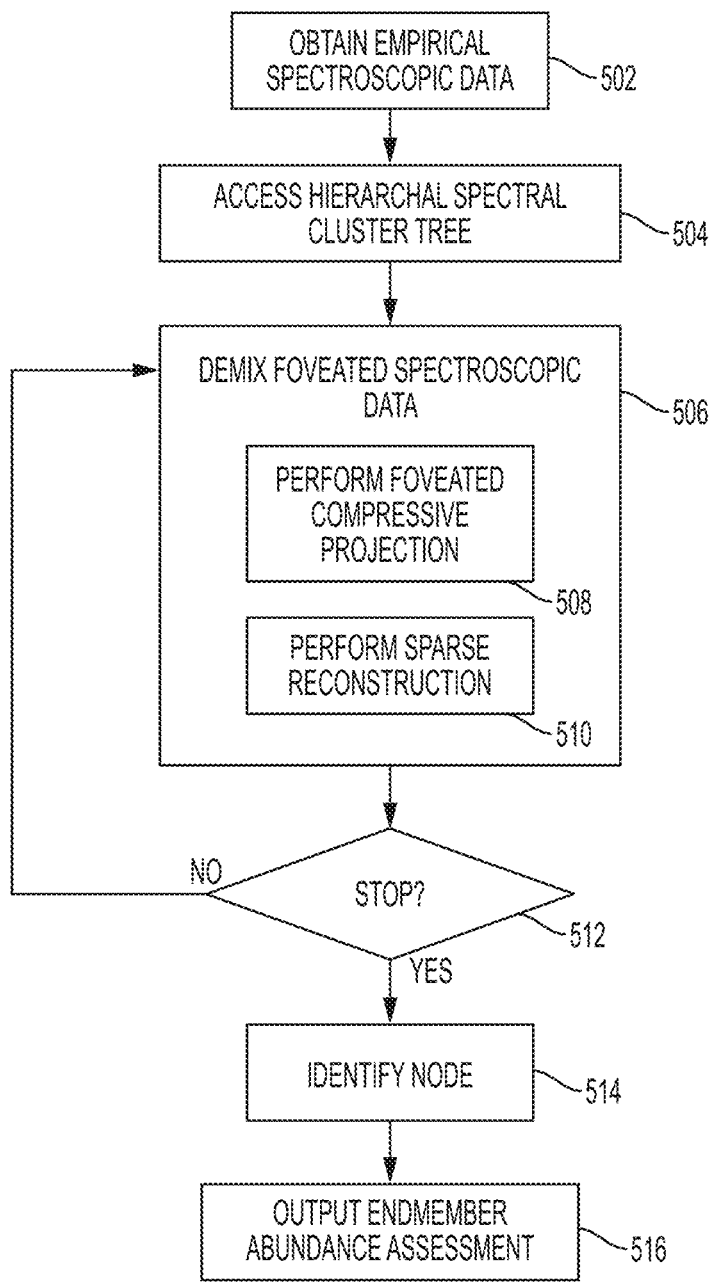
FIG. 5 is a flow diagram illustrating a method according to some examples.

FIG. 5 is a flow diagram illustrating a method according to some examples. The method of FIG. 5 may be implemented all or partially in a properly configured computing apparatus.

At block 502, the method obtains empirical spectroscopic data. The spectroscopic data may be obtained, by way of non-limiting examples, by measurement using appropriate sensors and optical elements, by retrieval from electronic storage (e.g., of previously measured data), or by acquisition over an electronic network (e.g., of previously measured data). Thus, the method may obtain the data by electronic transmission, for example. The spectroscopic data may have been previously acquired by any conventional technique for acquiring spectroscopic data, e.g., using appropriate sensors coupled to classical Newtonian optics, such as a microscope, telescope, or other optical lens arrangement. The spectroscopic data may represent a plurality of frequencies and associated amplitudes, which may be relative. More particularly, the spectroscopic data may represent measured electromagnetic energy that has been reflected by, fluoresced from, or undergone any other type of interaction with a specimen suitable for spectroscopy purposes.

At block 504, the method accesses a hierarchal spectral cluster tree. The accessing may be accessing electronically, and the hierarchal spectral cluster tree may represent a spectral library of stored spectra for many different materials, as described in detail herein in reference to FIGS. 2-4, for example.

At block 506, the method performs demixing of foveated spectroscopic data at at least one level of the hierarchal spectral cluster tree. The techniques of this block may be performed as described herein in reference to FIGS. 3 and 4, for example. The actions of block 506 may include foveated compressive projection and/or sparse reconstruction as described in detail herein, e.g., in reference to FIGS. 3 and 4.

At block 512, the method determines whether to stop traversing the branches of the hierarchal spectral cluster tree. According to some examples, the method may terminate on or before one or more branches of the hierarchal spectral cluster tree are traversed to the end (leaf) nodes. Alternately, or in addition, the method may terminate prior to the level of the leaf nodes if a user determines that the current results are sufficiently accurate. If the method continues at block 512, control passes back to block 506. Otherwise, control passes to block 514.

At block 514, the method identifies at least one node in the hierarchal spectral cluster tree. The identified node may correspond to the closest matching node traversed by the method at this point.

At block 516, the method outputs an endmember abundance assessment. The endmember abundance assessment may be based on the identified node of block 514. The endmember abundance assessment may be in human-readable format, e.g., with spectra replaced by chemical descriptions. The output may be in any of a variety of forms, e.g., output to a computer monitor, output to a video processor, output to a targeting mechanism, etc.

Figure 6:
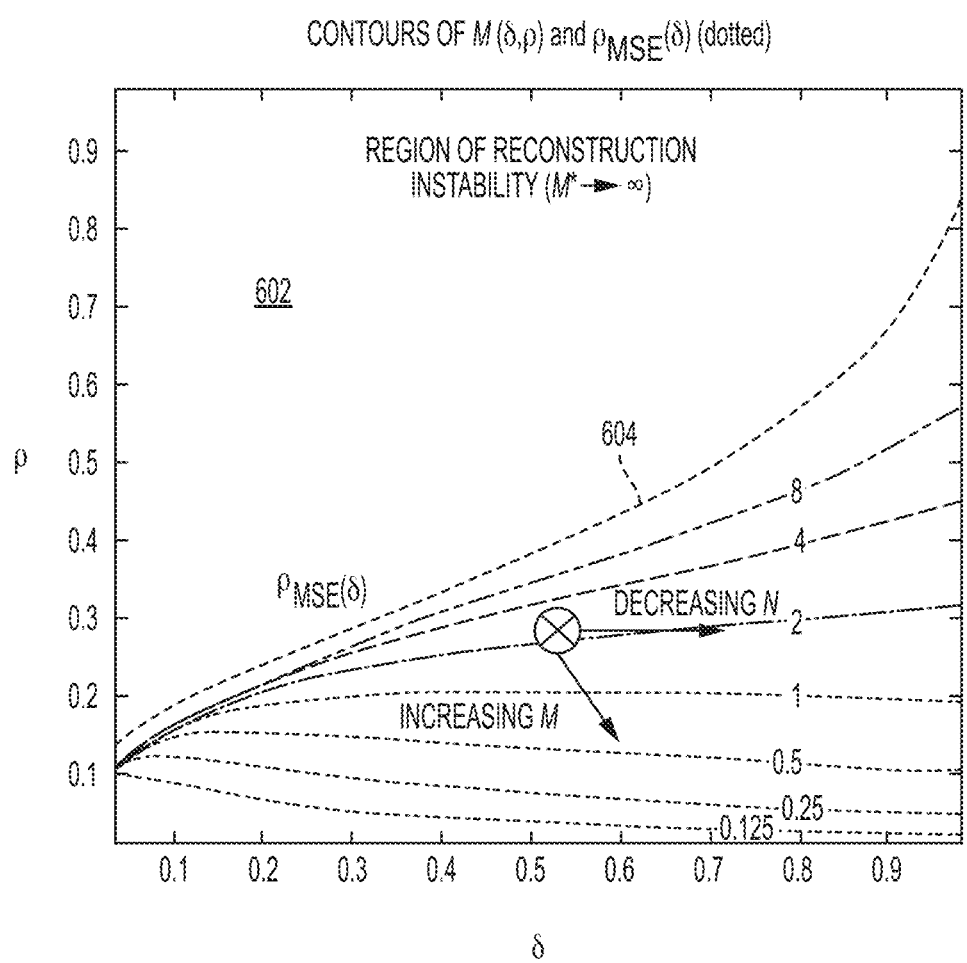
FIG. 6 illustrates the effects of foveation on compressive sensing reconstruction stability and accuracy according to some examples.

FIG. 6 illustrates the effects of foveation on compressive sensing reconstruction stability and accuracy according to some examples. In particular, FIG. 6 shows contours of the minimax noise sensitivity $M^*(\delta,\rho)$ in the $(\delta,\rho)$ phase plane 602. The term $\delta=M/N$ is the subsampling rate and $\rho=K/M$ is the sparsity. ($M^*$ should not be confused with the number of measurements M.) On average, the demixing noise or error is equal to $M^*$ times the noise in the measured mixture. Dotted curve 604 marks the phase boundary $(\delta,\rho_{MSE}(\delta))$. Above this curve, $M^*(\delta,\rho)$ approaches infinity and reconstruction (e.g., demixing) will fail. The colored lines represent contour lines of $M^*(\delta,\rho)$. Increasing the number of projections (measurements) M reduces $\rho$ and increases $\delta$, which improves the demixing accuracy by moving the previous operating point down the gradient of $M^*$. Foveation provides an additional degree of freedom for shifting the operating point in phase space in order to, e.g., ensure the stability of the demixing.

Thus, some examples cluster spectra in the library $\phi$ according to similarity using hierarchical tree clustering and perform a multi-resolution tree-based search to find the endmember abundances using a separate sparse reconstruction step at each level of the tree. Since N is reduced at each level, the reconstruction accuracy is improved at each level. The total number of operations across the levels will be much smaller and the final accuracy higher than would be the case if a single reconstruction with large N that searches across all endmember simultaneously were performed. This observation is illustrated using an example demixing problem as shown and described in reference to FIGS. 7-10 below.

The computations complexity of some examples will, in general, depend in part on the form of the library tree and how the endmembers are clustered. An upper bound on the computational complexity can be estimated by making worst-case assumptions (e.g., maximal branching at each node, all branches reach the terminal level) about the spectral library cluster tree and the paths down the tree. Toward such an estimate, assume for simplicity that all clusters have b branches and the paths to the K mixture endmembers do not overlap. Then the number of endmember candidates (library size) at the bottom of the tree is $N=N_E=b^L$, where L is the number of levels, and such examples must solve $KL=K \log(N_E)/\log(b)$ demixing problems, each with $N=N_C=b$. Therefore the computational complexity according to some examples is logarithmic in the size $N_E$ of the spectral library $\phi$. In the case of compressive sensing without foveation or tree-based clustering, an example would need to perform one large sparse reconstruction with $N=N_E=b^L$. Using MATLAB's CoSamp algorithm for sparse reconstruction, which has complexity of O(KMN) where K is the number of endmembers in the mixture, and assuming M=N, the complexity of examples employing foveated compressive projection is $O(LK^2b^2)$ and the complexity of compressive sensing is $O(Kb^{2L})$. Therefore, the computational complexity of examples that utilize foveated compressive projection is a factor of $KLb^{2(1-L)}$ less than that of examples utilizing compressive sensing alone. The complexity of an alternative Moore-Penrose matrix pseudo-inverse solution is $O(QN_E)=O(Qb^L)$, where Q is the number of hyperspectral channels. Proceeding down the tree using multi-level foveation and solving a small demixing problem at each level is therefore orders of magnitude less complex than solving a single large demixing problem without foveation.

For example, for $N_E=103$, K=2, b=10, and L=3, examples that employ foveated compressive projection may use a factor of $6\times10^{-4}$ fewer operations than examples that employ compressive sensing without foveation, and $1.3\times10^{-3}$ fewer operations than the Moore-Penrose matrix pseudo-inverse for this example (assuming Q=480 for the number of spectral channels).

FIGS. 7-10 depict various test cases comparing prior art techniques to various examples. These figures utilize data represented by FIG. 2. The N=16 mineral spectra from the collection depicted by FIG. 2 were used to form a spectral library ϕ to test various examples and contrast with prior art techniques. The number of wavelength bands was Q=480. A mixture x of two of the spectra plus 1% additive noise was then formed to be a test spectrum input with K=2. The abundances a were estimated using publicly available compressive sensing code.

Figure 7:
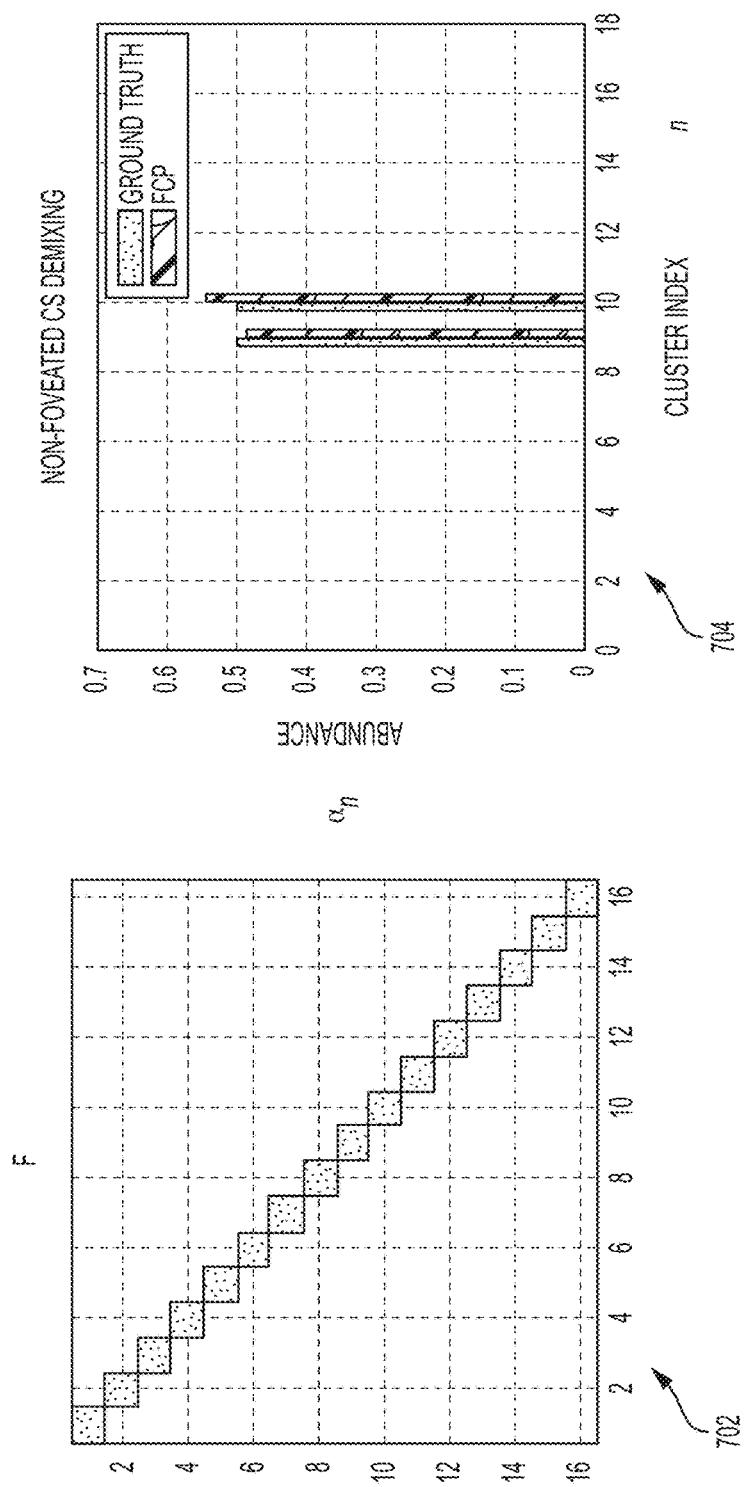
FIGS. 7-10 depict various test cases comparing prior art techniques to various examples.

In FIG. 7, the compressive sensing result for F equal to the N×N identity matrix (702), i.e., with no foveation, are shown. For M=13 projections with 5% noise, compressive sensing (704) had an error of 6.31%, while the pseudo-inverse error was 634%. In addition, the pseudo-inverse generated false alarms or nonzero values for endmembers not in the mixture. Compressive sensing without foveation had no false alarms. The MATLAB's CoSamp running time was 7.5 msec.

Figure 8:
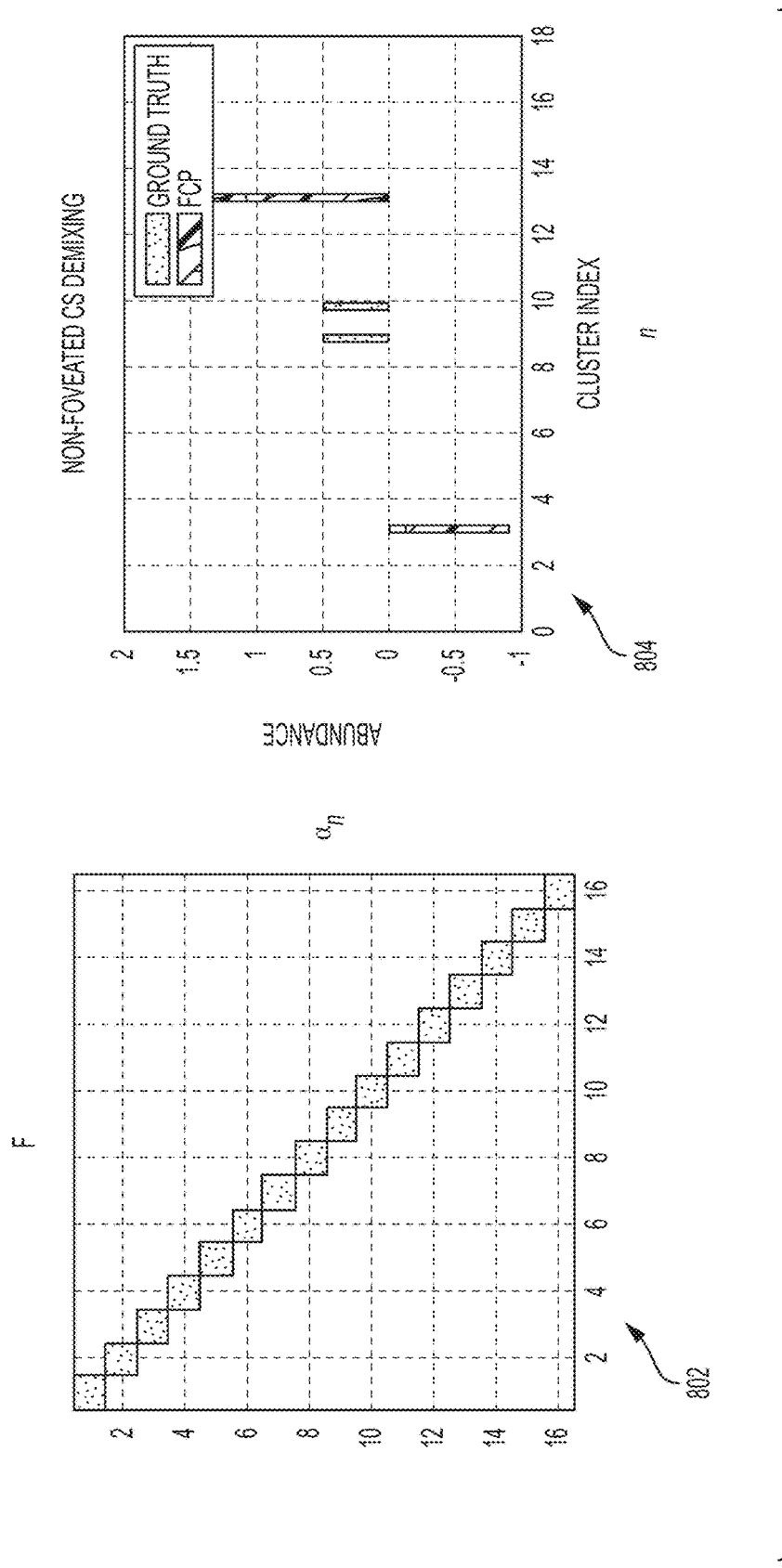

FIG. 8 depicts results for an input spectrum consisting of endmembers not in the library. F (802) is the identity matrix because there is no foveation. The measurement noise value was 5%. The compressive sensing residual was 10.1, an indication that compressive sensing could not converge due to the spectrum not being in the library. Thus, when the input spectrum consisted of endmembers not in the library, this could be detected from the large value of the residual error in reconstructing the measured spectrum 804.

Figure 9:
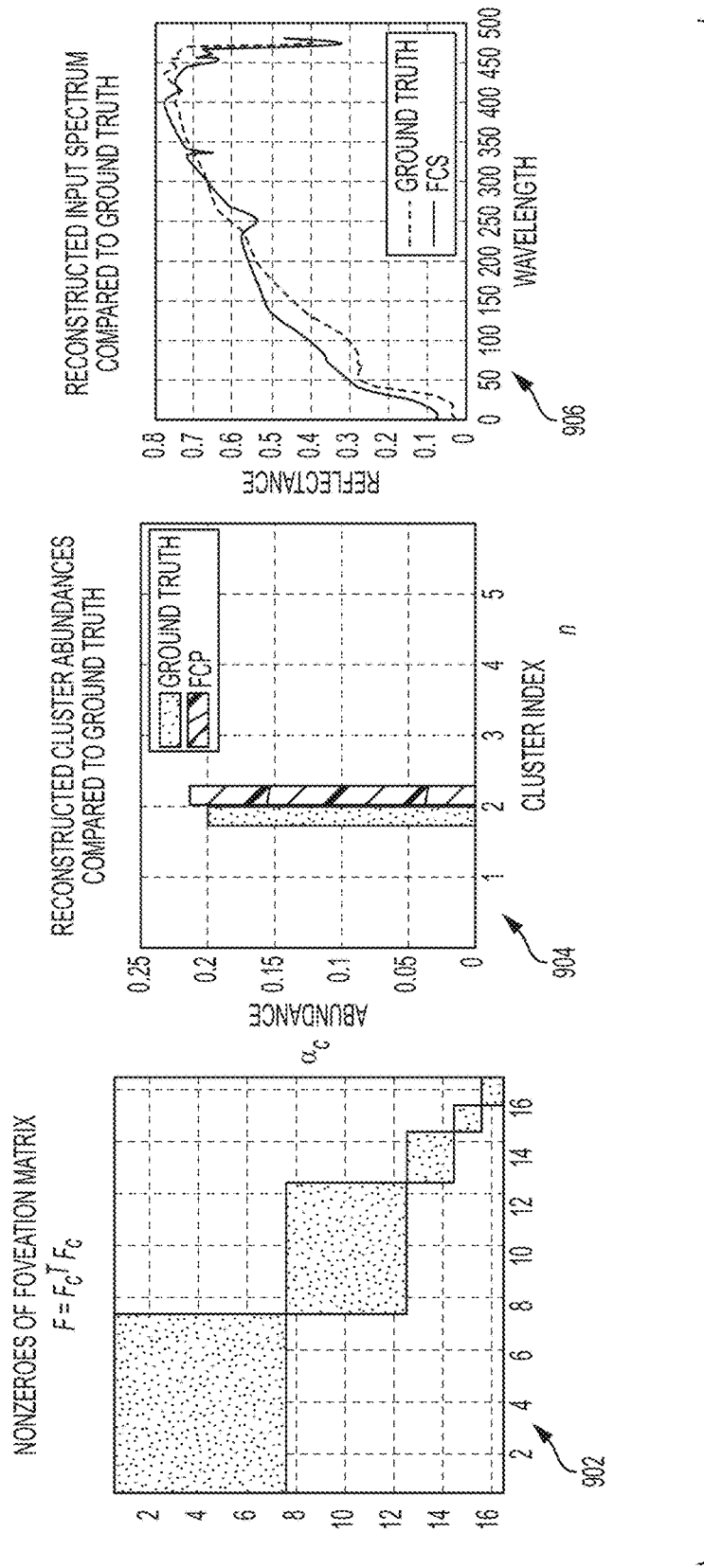
Figure 10:
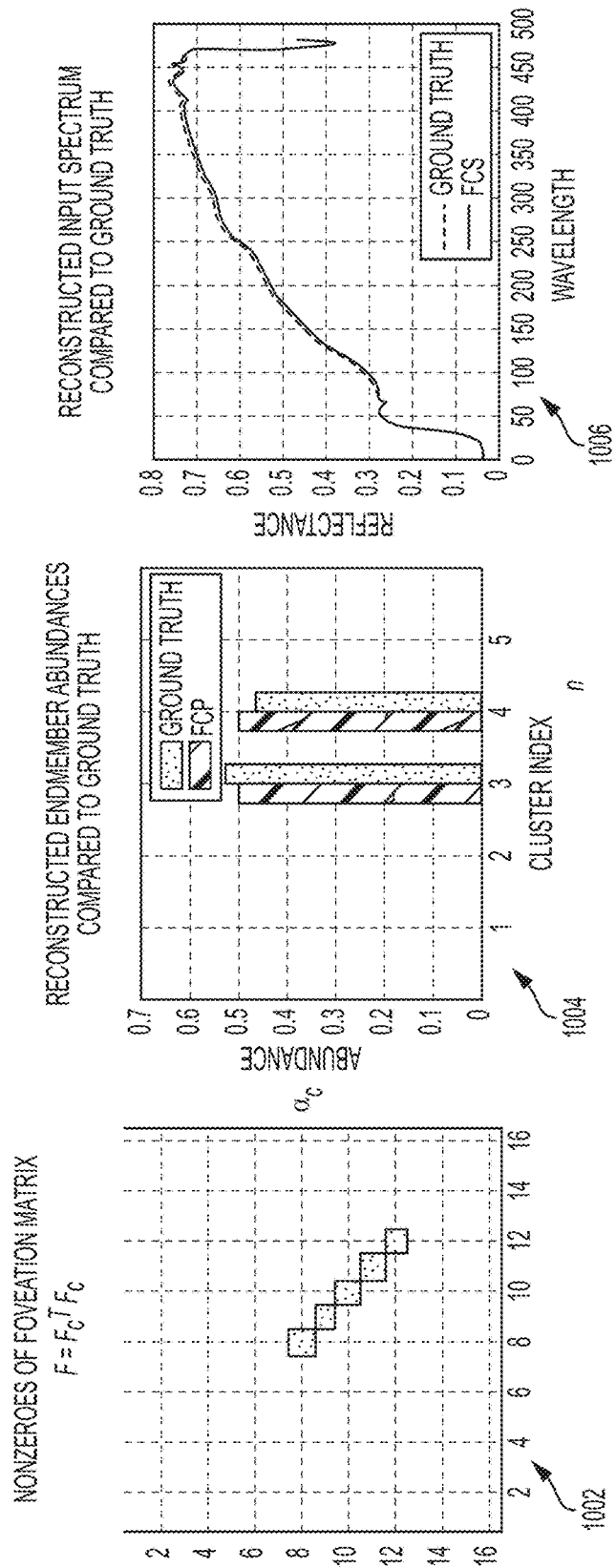

FIG. 9 depicts example results 904, 906 for foveation in Cluster Level 1. Foveated compressive sensing successfully detected that the mixture endmembers are in Cluster 2 with zero abundances for the other clusters. The pseudo-inverse generated nonzero abundances for all 5 clusters. For 5% measurement noise, the foveated compressive sensing error was 6.0% while the pseudo-inverse error was 115%. In FIG. 10, F (902) was used to foveate on the Cluster 2 that was determined in Cluster Level 1 to contain the mixture endmembers. Foveated compressive sensing successfully detected the correct two endmembers in the second cluster with zero abundances for the other three endmembers in the cluster. The pseudo-inverse generated nonzero abundances (false alarms) for all five endmembers. For 5% measurement noise, the foveated compressive sensing error was 5.9% while the pseudo-inverse error was 143%.

FIG. 10 depicts the same test case as in FIG. 9, but with F (1002) modified to foveate on the second cluster with higher resolution. Results 1004, 1006 are depicted. Note that Cluster 2 was determined to contain the endmembers in Cluster Level 1. The measurement noise value was 5% and MC=16. Foveated compressive projection successfully demixed the two endmembers in Cluster 2 with no false alarms. The foveated compressive projection error was 0.16%, while the pseudo-inverse error was 143%. Note the improved accuracy of reconstruction relative to Cluster Level 1 in FIG. 9.

The Table below summarizes the results for the test problem described herein in reference to FIGS. 7-10.

TABLE

|  | Pseudo-Inverse | Compressive Sensing | Two-Level Foveated Compressive Projection | Oracle with Prior Knowledge of Mixture Endmembers |
| --- | --- | --- | --- | --- |
| Demixing Error | 143% | 29.1% | 0.16% | 0.16% |
| Computation Complexity (Number of Operations) | 7680 | 416 | 200 | Not Applicable |
| Measured Running Time in MATLAB | 0.35 msec (Optimized Internal MATLAB Function) | 10.9 msec | 13.2 msec (Dominated by MATLAB Overhead) | Not Applicable |

Foveated compressive projection achieved noise-limited accuracy in determining the mixture endmember abundances and in accurately modeling the input spectrum. The compression factor for both compressive sensing and foveated compressive projection was equal to Q/K=480/2=240 times for this test example. The foveated compressive projection demixing error was reduced by 2.25 times and the number of operations was reduced by 3.85 times relative to compressive sensing. The foveated compressive projection demixing error of 0.16% was virtually equal to the oracle demixer, which had pre-knowledge of which endmembers are in the data and simply did a least squares fit to determine their abundances. Both compressive sensing and foveated compressive projection did not have any false alarms; in other words, the estimated abundances were zero for all end-members that were not in the input data. The pseudo-inverse method had a very large demixing error of 143% and showed nonzero abundances for almost all the end-members that were not in the input data. These results support the use of foveated compressive projection as a tool for automation of hyperspectral data analysis that achieves high accuracy, low false alarm rates, and low computational complexity by adapting to the data.

Figure 11:
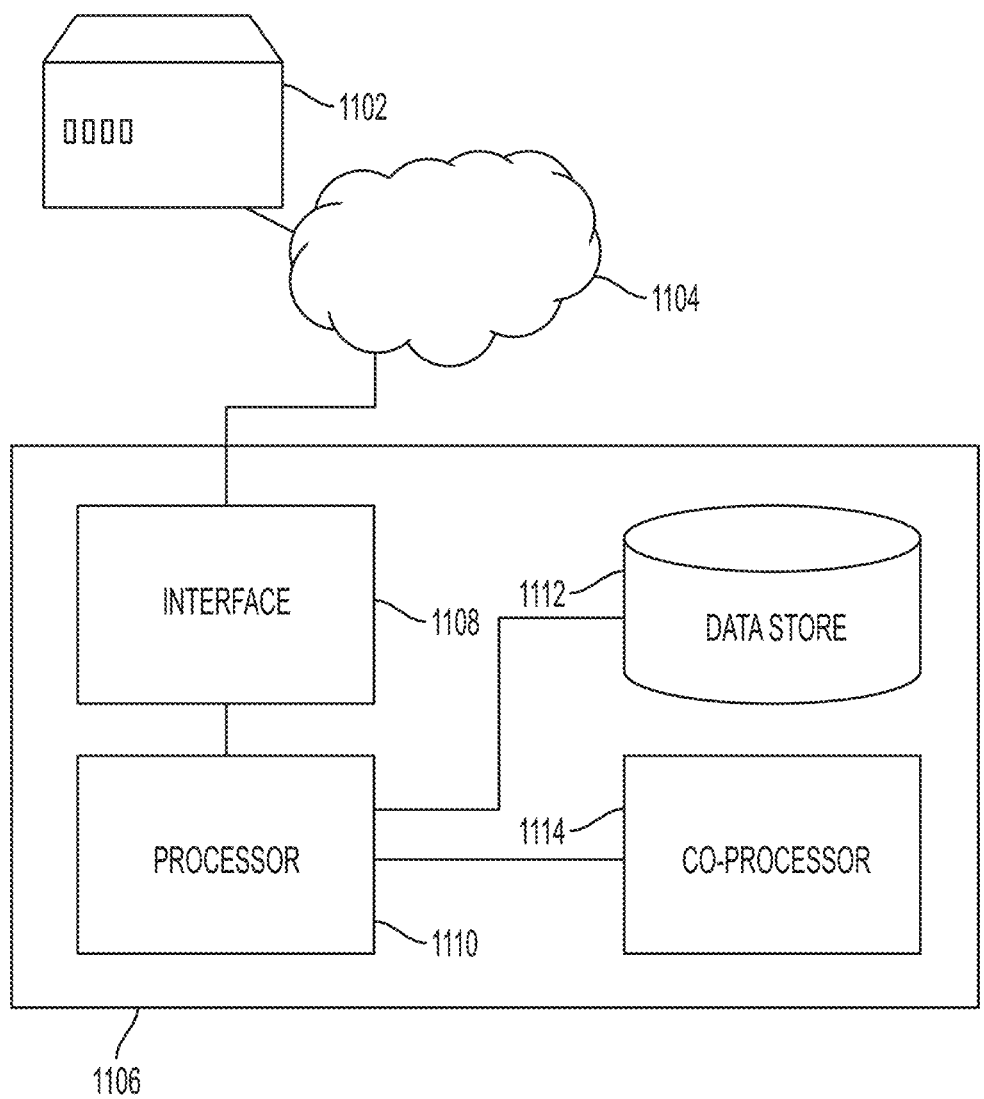
FIG. 11 depicts a system according to some examples.

FIG. 11 depicts an example system according to some embodiments. In particular, FIG. 11 illustrates various hardware, software, and other resources that can be used in implementations of apparatus 1106 in systems and methods according to disclosed embodiments. In embodiments as shown, apparatus 1106 can include a processor 1110 coupled to a random access memory operating under control of or in conjunction with an operating system. The processor 1110 in embodiments can be incorporated in one or more servers, clusters, or other computers or hardware resources, or can be implemented using cloud-based resources. Processor 1110 can communicate with the data store 1112, such as a database stored on a local hard drive or drive array, to access or store data. Processor 1110 can further communicate with a network interface 1108, such as an Ethernet or wireless data connection, which in turn communicates with the one or more networks 1104, such as the Internet or other public or private networks, via which spectroscopic data can be obtained from spectroscopic data acquisition device 1102. Device 1102 may be, for example, a spectroscope, a stand-off detector, a targeting system, or a remote or local persistent or dynamic storage device. Processor 1110 is further coupled to math co-processor 1114, which can parallelize operations as described herein. Processor 1110 can, in general, be programmed or configured to execute control logic and control demixing operations. Other configurations of apparatus 1106, associated network connections, and other hardware, software, and resources are possible.

The following are properties of some examples. Hierarchical clustering may be performed on the spectral library, and the resulting tree may be organized into a decision tree with multiple levels. Each cluster in a level may represent subcluster prototypes from the previous layer. The same clustering may be performed on both the library and the mixture endmember abundances using foveation operators $F_C^T$ and $F_C$. Foveated compressive projection and sparse reconstruction may be performed at each level of the tree to reconstruct and model the mixture spectrum with increasing accuracy as the tree is traversed from top to bottom until the endmembers and their abundances are determined. Oversampling, or using a larger number of projections than there are members of the cluster, may increase the accuracy of the demixing in the presence of noise. The prototypes selected at each level may determine how the tree is traversed in order to determine the endmembers in the mixture and their abundances. The tree clustering and foveation greatly reduces the overall computational complexity and improves scaling for large libraries by using multiple small sparse reconstructions arranged in a decision tree instead of performing one large reconstruction.

Note that examples are not limited to specific spectra of portions of the spectrum. Thus, some examples perform spectral demixing using foveated compressive projections. Some examples perform hyperspectral demixing using foveated compressive projections.

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method for spectral demixing, the method comprising:
    obtaining empirical spectroscopic data produced by a spectroscopic sensor and representing a plurality of frequencies of electromagnetic energy that has interacted with a specimen;
    accessing a computer readable representation of a hierarchal spectral cluster tree representing a spectral library;
    demixing, with data on each of a plurality of levels of the hierarchal spectral cluster tree, foveated spectroscopic data derived from the empirical spectroscopic data;
    identifying at least one node in the hierarchal spectral cluster tree as corresponding to the empirical spectroscopic data; and
    outputting an endmember abundance assessment of the specimen corresponding to at least the at least one node.

2. The method of claim 1, wherein the empirical spectroscopic data represents a plurality of frequencies of electromagnetic energy reflected off of the specimen.

3. The method of claim 1, wherein the empirical spectroscopic data represents a pixel.

4. The method of claim 1, wherein the hierarchal spectral cluster tree comprises a plurality of levels comprising at least one terminal level comprising nodes representing individual endmembers.

5. The method of claim 1, wherein the hierarchal spectral cluster tree comprises a plurality of prototype nodes, wherein a respective prototype node represents a plurality of endmembers.

6. The method of claim 1, further comprising hierarchical clustering the spectral library.

7. The method of claim 1, wherein the demixing foveated spectroscopic data comprises performing foveated compressive projection.

8. The method of claim 1, wherein the demixing foveated spectroscopic data comprises sparse reconstruction.

9. The method of claim 1, further comprising using the endmember abundance assessment for at least one of geospatial analysis, target recognition, surveillance, chemical identification, remote sensing, and combinations thereof.

10. The method of claim 1, wherein the outputting comprises causing a display in a human readable format.

11. A system for spectral demixing, the system comprising:
    an interface configured to obtain empirical spectroscopic data produced by a spectroscopic sensor and representing a plurality of frequencies of electromagnetic energy that has interacted with a specimen;
    at least one electronic processor communicatively coupled to a computer readable representation of a hierarchal spectral cluster tree representing a spectral library;
    at least one electronic processor configured to demix, with data on each of a plurality of levels of the hierarchal spectral cluster tree, foveated spectroscopic data derived from the empirical spectroscopic data;
    at least one electronic processor configured to identify at least one node in the hierarchal spectral cluster tree as corresponding to the empirical spectroscopic data; and
    at least one electronic processor configured to output an endmember abundance assessment of the specimen corresponding to at least the at least one node.

12. The system of claim 11, wherein the empirical spectroscopic data represents a plurality of frequencies of electromagnetic energy reflected off of the specimen.

13. The system of claim 11, wherein the empirical spectroscopic data represents a pixel.

14. The system of claim 11, wherein the hierarchal spectral cluster tree comprises a plurality of levels comprising at least one terminal level comprising nodes representing individual endmembers.

15. The system of claim 11, wherein the hierarchal spectral cluster tree comprises a plurality of prototype nodes, wherein a respective prototype node represents a plurality of endmembers.

16. The system of claim 11, further comprising at least one electronic processor configured to hierarchically cluster the spectral library.

17. The system of claim 11, wherein the at least one electronic processor configured to demix foveated spectroscopic data is further configured to perform foveated compressive projection.

18. The system of claim 11, wherein the at least one electronic processor configured to demix foveated spectroscopic data is further configured to perform sparse reconstruction.

19. The system of claim 11, further comprising at least one electronic processor configured to provide the endmember abundance assessment for at least one of geospatial analysis, target recognition, surveillance, chemical identification, remote sensing, and combinations thereof.

20. The system of claim 11, wherein the at least one electronic processor configured to output is further configured to cause a display in a human readable format.

* * * * *